United States Patent
Weindorf

(10) Patent No.: US 11,300,765 B2
(45) Date of Patent: Apr. 12, 2022

(54) DISPLAY SYSTEM

(71) Applicant: Visteon Global Technologies, Inc., Van Buren Township, MI (US)

(72) Inventor: Paul F. Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 49 days.

(21) Appl. No.: 16/243,673

(22) Filed: Jan. 9, 2019

(65) Prior Publication Data

US 2020/0218044 A1 Jul. 9, 2020

(51) Int. Cl.
  *G02B 17/00* (2006.01)
  *H04N 13/349* (2018.01)
  (Continued)

(52) U.S. Cl.
  CPC ........... *G02B 17/006* (2013.01); *G02B 30/56* (2020.01); *H04N 13/346* (2018.05); *H04N 13/349* (2018.05)

(58) Field of Classification Search
  CPC ...... G02B 17/006; G02B 30/56; G02B 5/124; G02B 17/002; G02B 5/136; G02B 27/0101; G02B 27/0172; G02B 5/08; G02B 17/008; G02B 2027/0118; G02B 5/0816; G02B 5/09; G02B 6/0055; G02B 2027/0125; G02B 27/106; G02B 30/00; G02B 30/40; G02B 3/0062; G02B 2207/123; G02B 27/022; G02B 5/30; G02B 6/0056; G02B 27/01; G02B 27/2278; G02B 30/50–05; H04N 13/349; H04N 13/346; H04N 13/388; H04N 13/395; H04N 5/2254; H04N 13/302; H04N 13/307; H04N 13/322; H04N 2213/001; H04N 13/363; H04N 13/39; H04N 13/351; H04N 13/354; G03H 2223/24; G03H 1/0005; G03B 21/625;
  (Continued)

(56) References Cited

U.S. PATENT DOCUMENTS

| 8,867,136 B2 | 10/2014 | Hashikawa | |
|---|---|---|---|
| 2004/0169619 A1* | 9/2004 | Hata | H04N 13/395 345/1.1 |

(Continued)

OTHER PUBLICATIONS

Yamane et al., "Fabrication and evaluation of Dihedral Corner Reflector Array for floating image manufactured by synchrotron radiation," 2015 International Conference on Electronics Packaging and iMAPS All Asia Conference (ICEP-IAAC), Kyoto, 2015, (Year: 2015).*

*Primary Examiner* — Marin Pichler
*Assistant Examiner* — Alberto J Betancourt
(74) *Attorney, Agent, or Firm* — Quinn IP Law

(57) ABSTRACT

A display system includes at least one display unit, and a mirror array plate. The mirror array plate reflects light emitted from the display unit along a viewing path, and focuses the reflected light at a floating viewing plane positioned between the mirror array plate and a viewing location. The display system may include a micro-louver film disposed adjacent to the display unit that controls light dispersion of the emitted light from the display unit. The display system may include multiple display units arranged relative to the mirror array plate to present respective images on respective floating viewing planes to provide a three dimensional image.

17 Claims, 3 Drawing Sheets

(51) Int. Cl.
*H04N 13/346* (2018.01)
*G02B 30/56* (2020.01)

(58) Field of Classification Search
CPC ........ G03B 21/10; G03B 21/62; G03B 21/28; G03B 21/602; G03B 21/60
USPC ............... 359/627, 617, 618, 459, 463, 727; 353/10, 19, 98–99; 348/54; 362/346, 362/507; 352/66–67; 396/305–309
See application file for complete search history.

(56) References Cited

U.S. PATENT DOCUMENTS

| | | | |
|---|---|---|---|
| 2008/0284792 A1* | 11/2008 | Bell | G09G 5/00 345/589 |
| 2009/0242142 A1* | 10/2009 | Bellwood | G06F 21/84 160/127 |
| 2011/0085182 A1* | 4/2011 | Shiota | G02F 1/133524 356/620 |
| 2011/0181949 A1* | 7/2011 | Hashikawa | G02B 17/006 359/463 |
| 2014/0110040 A1* | 4/2014 | Cok | G02B 5/3058 156/182 |
| 2020/0033618 A1* | 1/2020 | Li | G02B 27/283 |
| 2020/0050009 A1 | 2/2020 | Saitoh et al. | |
| 2020/0183183 A1* | 6/2020 | Oyama | G03B 21/00 |

\* cited by examiner

DISPLAY SYSTEM

TECHNICAL FIELD

Embodiments described herein generally relate to a display system for displaying an image, and more particularly to a display system for displaying an image on one or more floating viewing planes in space.

BACKGROUND

Electronic display systems are used in many different technology applications. In some applications, it is desirable to present a three dimensional appearance for aesthetic and/or functional reasons. In other applications, it is desirable to present an image on a floating plane, such that the image appears to be floating in space. For example, presenting a three dimensional image or a floating image in an automotive application is desirable from an aesthetic perspective, and, from a functional perspective, may reduce driver recognition time for the information being displayed.

SUMMARY

A display system is provided. In one or more embodiments, the display system includes a display unit having a display surface. The display unit is operable to emit light from the display surface along a light path that is substantially orthogonal to the display surface. A mirror array plate is positioned relative to the display surface. The mirror array plate is operable to reflect the emitted light from the display unit along a viewing path, and toward a viewing location. The mirror array plate is also operable to focus the reflected light at a viewing plane positioned between the mirror array plate and the viewing location. The display unit includes a micro-louver film disposed adjacent to the display surface. The micro-louver film is operable to control light dispersion of the emitted light from the first display unit relative to the light path.

In one or more embodiments, the display system includes a mirror array plate having a first surface and an opposing second surface. The first surface and the second surface are parallel with each other. A first display unit has a first display surface positioned oblique to the mirror array plate. The first display surface is positioned opposite the first surface of the mirror array plate. The first display unit is operable to emit light from the first display surface, along a first light path that is substantially orthogonal to the first display surface. A second display unit has a second display surface. The second display surface is positioned oblique to the mirror array plate, and is positioned opposite the second surface of the mirror array plate. The second display unit is operable to emit light from the second display surface, along a second light path that is substantially orthogonal to the second display surface. The mirror array plate is operable to reflect the emitted light from the first display unit along a viewing path and toward a viewing location, and focus the reflected light from the first display unit at a first viewing plane positioned between the mirror array plate and the viewing location. A reflector is disposed on the second surface of the mirror array plate. The reflector is operable to reflect the light emitted from the second display unit. The light from the second display unit that is reflected by the reflector appears to a viewer to be focused at a second viewing plane positioned beyond the mirror array plate relative to the viewing location.

In one or more embodiments, a first display unit has a first display surface, and is operable to emit light from the first display surface along a light path that is substantially orthogonal to the first display surface. A second display unit has a second display surface. The second display surface of the second display unit is disposed parallel with and in spaced relationship relative to the first display surface of the first display unit. The second display unit is operable to emit light from the second display surface along the light path, and is positioned to direct light through the first display surface of the first display unit. A mirror array plate is positioned adjacent to the first display unit and oblique relative to the first display surface of the first display unit. The mirror array plate is operable to reflect the emitted light from the first display unit and the second display unit along a viewing path toward a viewing location. The first display surface and the second display surface are separated along the light path by a first distance. The mirror array plate is operable to focus the reflected light from the first display unit at a first viewing plane, and focus the reflected light from the second display unit at a second viewing plane. The first viewing plane and the second viewing plane are separated along the viewing path by a second distance, with the first distance being equal to the second distance.

In one or more embodiments, a display system includes a micro-louver film positioned adjacent to a display unit. In the display system, a mirror array plate may include a viewing angle. The micro-lover film may prevent or limit dispersion of light emitted from the display unit, prior to reaching the mirror array plate. In doing so, light reflected off of the mirror array plate may be within the viewing angle, which may improve quality and clarity of an image produced from the display system. For example, because some mirror array plates exhibit a viewing angle that is limited to plus or minus twenty degrees (+/−20°) relative to the viewing path, viewed images from outside of this range may become blurry. Accordingly, by positioning the micro-louver film adjacent the display unit, which prevents or limits dispersion of the light emitted from the display unit relative to the light path, prior to reaching the mirror array plate, the reflected light from the mirror array plate is substantially limited to within the plus or minus twenty degree viewing angle relative to the viewing path, which improves image quality and clarity. Additionally, stray light from the display system may be limited so that the stray light does not shine on the windshield and/or side windows of the vehicle. Furthermore, the micro-louver film may provide a privacy function by limiting the viewing angle. For example, a passenger in front of the display system may view an image, whereas another passenger and/or a driver of the vehicle would not be able to view the image. In some embodiments, the micro-louver film may be one dimensional to limit light either vertically or horizontally, or two dimensional to limit light in both the vertical and horizontal directions.

In some embodiments, the display system may include multiple display units with the mirror array plate in order to present images on multiple viewing planes, thereby providing a three dimensional image. For example, in one or more embodiments, the display system may include a display unit positioned above the mirror array plate, and another display unit positioned below the mirror array plate. When a reflector is added to a surface of the mirror array plate, the displays system presents the respective images from the different display units on two different floating viewing planes. In other embodiments, the multiple display units may be stacked one on top of another, with the upper display units including a transparent display unit. Light from all of the display units is directed along the same light path toward the mirror array plate. Because the different display units are spaced from each other along the light path, the mirror array plate focuses the light from each at a different floating viewing plane, thereby providing a three dimensional image. The display system may include a micro-louver film to control light dispersion from one or more of the display units as described above to improve the clarity and quality of the three dimensional images.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a display system 20, 120, 220 is generally described. The display system 20, 120, 220 is not shown or described as part of a specific application. However, it should be appreciated that the display system 20, 120, 220, or embodiments thereof, may be utilized in many different applications, such as but not limited to a vehicular application, an entertainment application, an advertising display application, etc., Exemplary vehicular applications include but are not limited to automobiles, airplanes, trains, boats, motorcycles, ATV's, UTV's, etc. For example, the display system 20, 120, 220 may be incorporated into an instrument cluster, a center console display, a passenger entertainment display, etc. Exemplary entertainment applications include, but are not limited to, gaming systems, televisions, computer screens, etc. The teachings of this disclosure are not limited to the exemplary applications and environments noted above.

Figure 1:
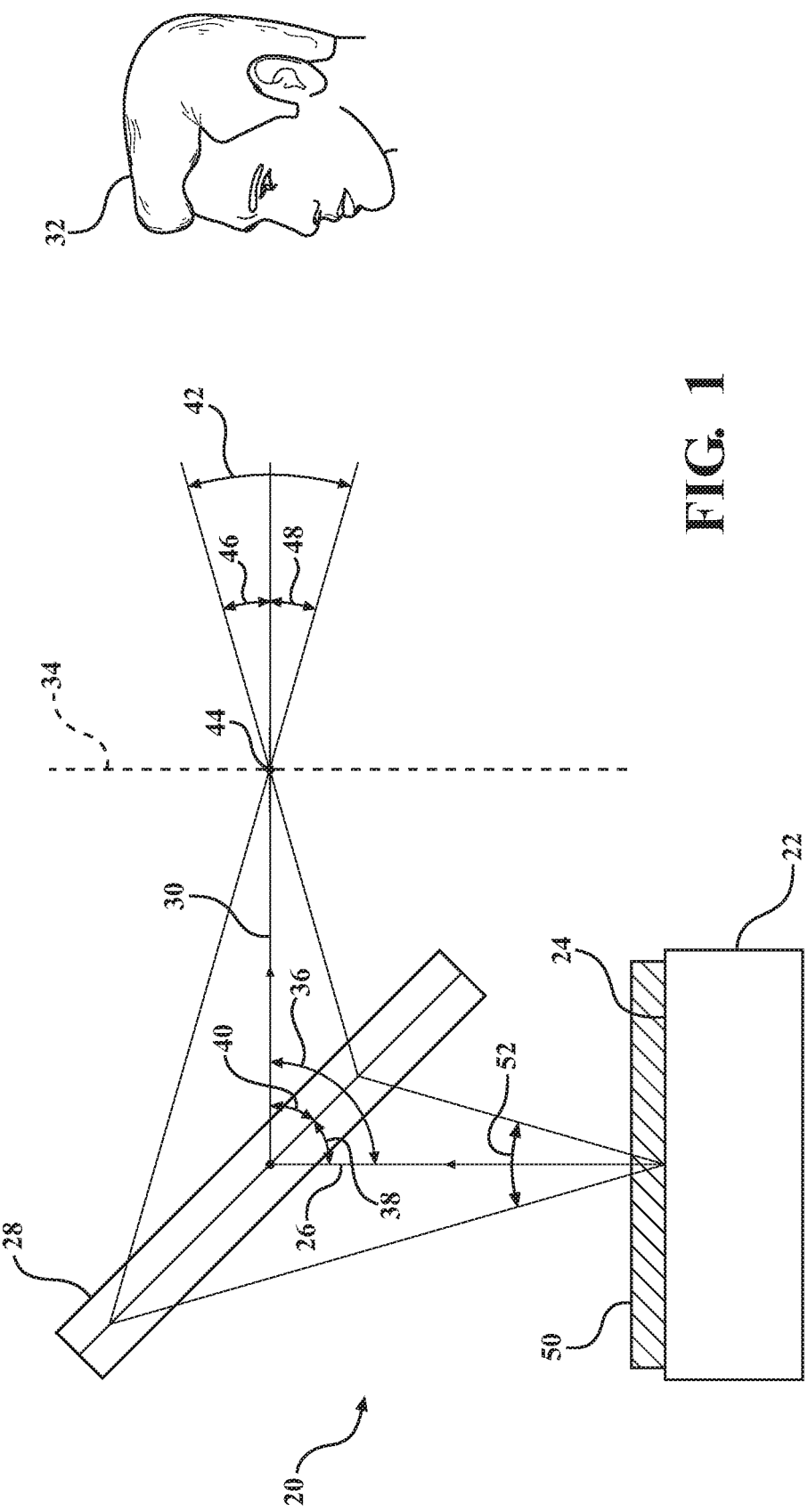
FIG. 1 is a schematic plan view of a display system, which is in accordance with one or more embodiments.

FIG. 1 shows a display system 20, which is in accordance with one or more embodiments. The display system 20 includes a display unit 22 having a display surface 24. The display unit 22 may include a device that is capable of generating and emitting light, particularly for forming an image on the display surface 24. For example, the display unit 22 may include, but is not limited to, a Light Emitting Diode (LED) display, an Organic Light Emitting Diode (OLED) display, a Thin Film Transistor (TFT) display, a Liquid Crystal Display (LCD), a Plasma Display Panel (PDP), etc. The display unit 22 is operable to emit light from the display surface 24 along a light path 26. The light path 26 is substantially orthogonal to the display surface 24 of the display unit 22. As used herein, the term substantially orthogonal should be interpreted to be within +/−10 degrees of orthogonal.

A mirror array plate 28 is positioned oblique relative to the display surface 24. The mirror array plate 28 reflects the emitted light from the display unit 22 along a viewing path 30 and toward a viewing location 32. The viewing location 32 represents a location of a viewer (e.g., a person) relative to the display system 20. The mirror array plate 28 focuses the reflected light from the display unit 22 at a viewing plane 34. The viewing plane 34 is positioned on and is substantially orthogonal to the viewing path 30. The viewing plane 34 is disposed between the mirror array plate 28 and the viewing location 32. An image reflected by the mirror array plate 28, and focused on the viewing plane 34, appears to the viewer to be floating in space. As such, the viewing plane 34 may be referred to as a floating viewing plane 34. In one embodiment, the mirror array plate 28 is a transmissive dihedral corner reflector micro-mirror array, such as the ASKA3D plate from Asukanet Co. However, it should be appreciated that the mirror array plate 28 is not limited to the aforementioned example.

As described above, the light from the display unit 22 is emitted along the light path 26, and the mirror array plate 28 reflects the light from the display unit 22 along the viewing path 30. The light path 26 and the viewing path 30 intersect, and form a reflection angle 36 therebetween. The mirror array plate 28 is positioned at the intersection of the light path 26 and the viewing path 30, and is oriented relative to the display surface 24 of the display unit 22 to bisect the reflection angle 36. In one embodiment, the reflection angle 36 is approximately ninety degrees. As such, the mirror array plate 28 is arranged to bisect the ninety degree reflection angle 36 into two equal forty five degree angles, i.e., a display side angle 38 and a viewing side angle 40. However, it should be appreciated that, in other embodiments, the reflection angle 36 may vary more or less from the approximately ninety-degree embodiment. Regardless of the value of the reflection angle 36, the mirror array plate 28 may bisect the reflection angle 36 to form the equal display side angle 38 and viewing side angle 40.

The mirror array plate 28 focuses the light at the viewing plane 34, such that the image exhibits a viewing angle 42. The viewing angle 42 is an angle having a vertex 44 at the intersection of the viewing path 30 and the viewing plane 34, and extending outward from the viewing plane 34 toward the viewing location 32. In some embodiments, the viewing angle 42 may be approximately forty degrees, and is limited to approximately plus or minus twenty degrees relative to the viewing path 30, i.e., the viewing angle 42 ranges from twenty degrees on a first side 46 of the viewing path 30 to twenty degrees on a second side 48 of the viewing path 30. Light outside of the viewing angle 42 may be blurry and/or not visible to the viewer.

The display unit 22 may include a micro-louver film 50 disposed adjacent to the display surface 24. Depending upon the specific embodiment of the display unit 22, the micro-louver film 50 may be positioned in front of the display unit 22, immediate next to the display surface 24, such as shown in FIG. 1, or between a backlight and the display unit 22. The micro-louver film 50 controls dispersion of the light emitted light from the display unit 22 relative to the light path 26. The micro-louver film 50 may be one dimensional to limit light either vertically or horizontally, or two dimensional to limit light in both the vertical and horizontal directions. In one or more embodiments, the micro-louver film 50 controls light dispersion of the light emitted from the display unit 22 to a maximum angle 52 that is equal to the viewing angle 42 exhibited by the mirror array plate 28. For example, in one embodiment, if the viewing angle 42 is equal to forty degrees, the micro-louver film 50 controls light dispersion of the emitted light to a maximum angle 52 of plus or minus twenty degrees relative to the light path 26, such that the maximum angle 52 is equal to forty degrees. In another example, if the viewing angle 42 exhibited by the mirror array plate 28 is equal to fifty degrees, e.g., plus or minus twenty five degrees relative to the viewing path 30, then the micro-louver film 50 may be configured to control light dispersion of the emitted light from the display unit 22 to plus or minus twenty five degrees relative to the light path 26, such that the maximum angle 52 is equal to fifty degrees.

In one or more embodiments, because the mirror array plate 28 bisects the reflection angle 36, and the micro-louver film 50 limits light dispersion to the viewing angle 42 exhibited by the mirror array plate 28, light that is outside of the viewing angle 42 is prevented from reaching the mirror array plate 28. As such, only light that will fall within the viewing angle 42 of the mirror array plate 28 is reflected toward the viewer, which increases clarity and quality of the image displayed to the viewer on the viewing plane 34.

In some embodiments, the micro-louver film 50 may include a variable micro-louver film 50 that is operable to provide a non-uniform viewing cone across the display surface 24 of the display unit 22. An embodiment of the variable micro-louver film 50 includes DARC Glass from Incom USA Inc. However, it should be appreciated that the variable micro-louver film 50 is not limited to the aforementioned example. In other embodiments, the micro-louver film 50 may include a uniform micro-louver film 50 that is operable to provide a uniform viewing cone across the display surface 24 of the display unit 22. An embodiment of the uniform micro-louver film 50 includes Advance Light Control Film (ALCF) from 3M. However, it should be appreciated that the uniform micro-louver film is not limited to the aforementioned example.

In, some embodiments of the micro-louver film 50 may be attached directly to an exterior of the display surface 24. In other embodiments, the micro-louver film 50 may be attached to a back-light of the display unit 22, between the back-light and the display surface 24.

Figure 2:
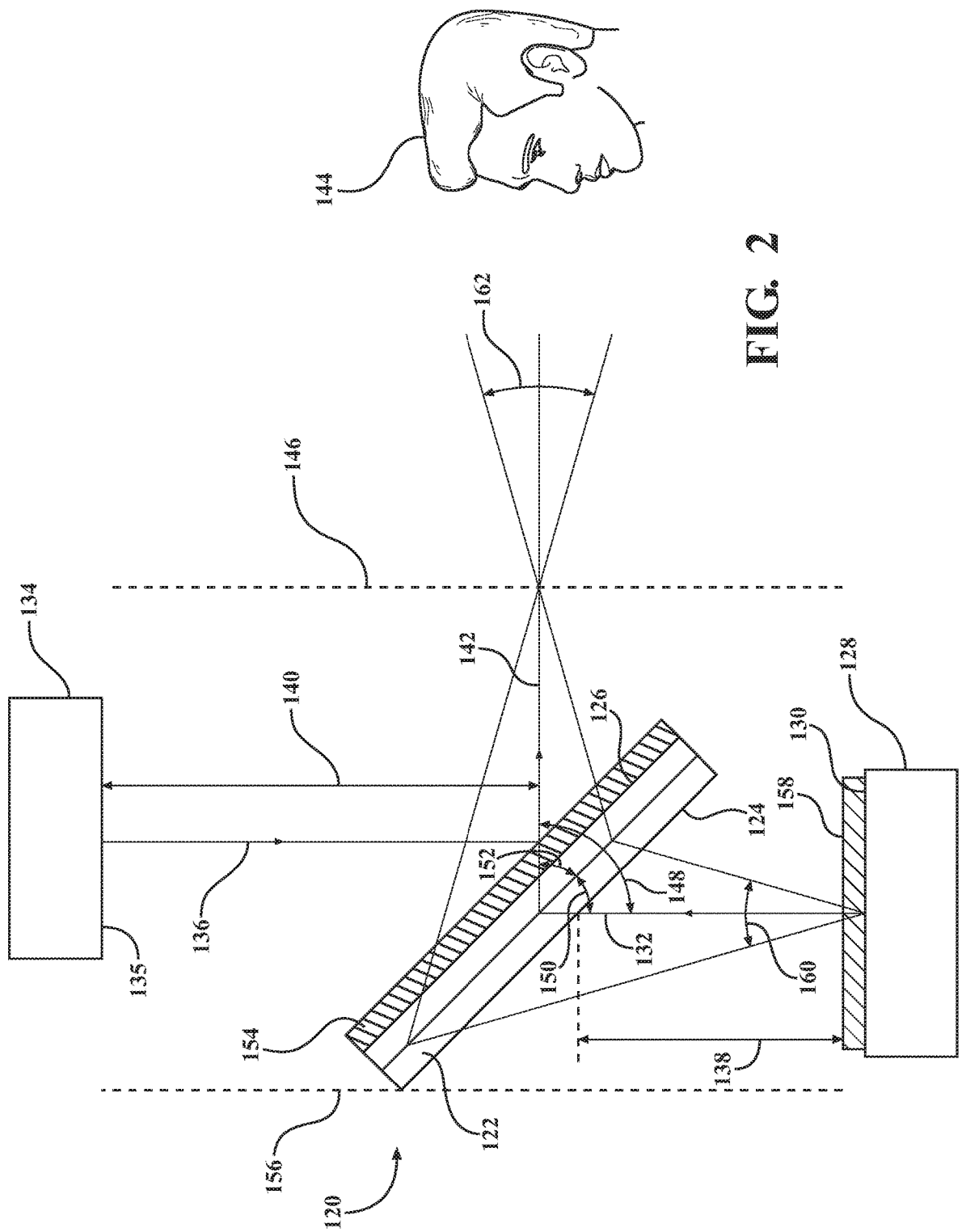
FIG. 2 is a schematic plan view of a display system, which is in accordance with one or more embodiments.

FIG. 2 shows a display system 120, which is in accordance with one or more embodiments. The display system 120 includes a mirror array plate 122. The mirror array plate 122 includes a first surface 124 and an opposing second surface 126. The first surface 124 and the second surface 126 are parallel with each other. In one embodiment, the mirror array plate 122 is a transmissive dihedral corner reflector 154 micro-mirror array, such as the ASKA3D plate from Asukanet Co. However, it should be appreciated the mirror array plate 122 is not limited to the aforementioned example.

A first display unit 128 has a first display surface 130 that is positioned oblique to the mirror array plate 122, and is positioned opposite the first surface 124 of the mirror array plate 122. The first display unit 128 may include a device that is capable of generating and emitting light, particularly for forming an image on the first display surface 130. For example, the first display unit 128 may include, but is not limited to, a LED display, an OLED display, a TFT display, a LCD, a PDP, etc. The first display unit 128 is operable to emit light from the first display surface 130 along a first light path 132. The first light path 132 is substantially orthogonal to the first display surface 130.

A second display unit 134 has a second display surface 135 that is positioned oblique to the mirror array plate 122, and is positioned opposite the second surface 126 of the mirror array plate 122. The second display unit 134 may include a device that is capable of generating and emitting light, particularly for forming an image on the display surface. For example, the second display unit 134 may include, but is not limited to, a LED display, an OLED display, a TFT display, a LCD, a PDP, etc. The second display unit 134 is operable to emit light from the second display surface 135 along a second light path 136. The second light path 136 is substantially orthogonal to the second display surface 135.

In one or more embodiments, the first display surface 130 of the first display unit 128 and the second display surface 135 of the second display unit 134 may be parallel with each other. However, in other embodiments, the first display surface 130 and the second display surface 135 may not be parallel with each other. In one or more embodiments, a first distance 138 between the first display surface 130 and the first surface 124 of the mirror array plate 122 may be substantially equal to a second distance 140 between the second display surface and the second surface 126 of the mirror array plate 122. However, in other embodiments, the first distance 138 may be different than the second distance 140. Increasing the first distance 138 moves the first viewing plane 146 farther from the mirror array plate 122 and closer to a viewing location 144, whereas decreasing the first distance 138 moves the first viewing plane 146 toward the mirror array plate 122 and away from the viewing location 144.

The mirror array plate 122 reflects the light emitted from the first display unit 128 along a viewing path 142 and toward the viewing location 144. The viewing location 144 represents a location of a viewer (e.g., a person) relative to the display system 120. The mirror array plate 122 focuses the reflected light from the first display unit 128 at a first viewing plane 146. The first viewing plane 146 is positioned on and is substantially orthogonal to the viewing path 142. The first viewing plane 146 is disposed between the mirror array plate 122 and the viewing location 144. An image reflected by the mirror array plate 122, and focused on the first viewing plane 146, appears to the viewer to be floating in space. As such, the first viewing plane 146 may be referred to as a first floating viewing plane.

As described above, the light from the first display unit 128 is emitted along the first light path 132, and the mirror array plate 122 reflects the light from the first display unit 128 along the viewing path 142. The first light path 132 and the viewing path 142 intersect, and form a reflection angle 148 therebetween. The mirror array plate 122 is positioned at the intersection of the first light path 132 and the viewing path 142, and is oriented relative to the first display surface 130 of the first display unit 128 to bisect the reflection angle 148. In one embodiment, the reflection angle 148 is approximately ninety degrees. As such, the mirror array plate 122 is arranged to bisect the ninety degree reflection angle 148 into two equal angles, i.e., a forty five degree display side angle 150 and a forty five degree viewing side angle 152. However, it should be appreciated that, in other embodiments, the reflection angle 148 may vary more or less than the approximately ninety degree embodiment. Regardless of the value of the reflection angle 148, the mirror array plate 122 may bisect the reflection angle 148 so that the display side angle 150 and viewing side angle 152 are equal.

In one or more embodiments, a reflector 154 is disposed on the second surface 126 of the mirror array plate 122. The reflector 154 reflects a portion of the light emitted from the second display unit 134 along the viewing path 142. In addition, the reflector 154 allows a portion of the light emitted from the first display unit 128 to pass through the reflector 154 along the viewing path 142. The reflector 154 may be semi-transparent, so that at least a portion of the light from the first display unit 128 entering the mirror array plate 122 through the first surface 124 and exiting the mirror array plate 122 through the second surface 126 and the reflector 154, may pass through the reflector 154. In one embodiment, the reflector 154 reflects fifty percent of light, and transmits or allows the other fifty percent of light to pass through the reflector 154. The reflector 154 may include, but is not limited to, one of a semi-transparent mirror or a semi-transparent reflective polarizing layer.

In one or more embodiments, the reflector 154 reflects a portion of the light emitted from the second display unit 134 toward the viewing location 144, such that the light from the second display unit 134 reflected toward the viewing location 144 by the reflector 154 appears to be focused at a second viewing plane 156. The second viewing plane 156 is positioned on and is substantially orthogonal to the viewing path 142. The second viewing plane 156 is positioned beyond the mirror array plate 122 relative to the viewing location 144. An image reflected by the reflector 154 on the second surface 126 of the mirror array plate 122, appears to the viewer to be focused on the second viewing plane 156, and also appears to the viewer to be floating in space. As such, the second viewing plane 156 may be referred to as a second floating viewing plane. The first viewing plane 146 and the second viewing plane 156 are spaced apart from each other along the viewing path 142. Increasing the second distance 140 moves the second viewing plane 156 farther from the mirror array plate 122 and farther from the viewing location 144, whereas decreasing the second distance 140 moves the second viewing plane 156 toward the mirror array plate 122, and closer to the viewing location 144.

The first display unit 128 may include a micro-louver film 158 disposed adjacent to the first display surface 130 of the first display unit 128. Depending upon the specific embodiment of the first display unit 128, the micro-louver film 158 may be positioned in front of the first display unit 128, immediate next to the first display surface 130, such as shown in FIG. 2, or between a backlight and the first display unit 128. The micro-louver film 158 controls dispersion of the light emitted light from the first display unit 128 relative to the first light path 132. The micro-louver film 158 may be one dimensional to limit light either vertically or horizontally, or two dimensional to limit light in both the vertical and horizontal directions. In an embodiment, the micro-louver film 158 controls light dispersion of the light emitted from the first display unit 128 to a maximum angle 160 that is equal to the viewing angle 162 exhibited by the mirror array plate 122. The micro-louver film 158 may include a variable micro-louver film 158 that is operable to provide a non-uniform viewing cone across the first display surface 130 of the first display unit 128, or a uniform micro-louver film 158 that is operable to provide a uniform viewing cone across the first display surface 130 of the first display unit 128. The second display unit 134 may similarly include a micro-louver film.

Figure 3:
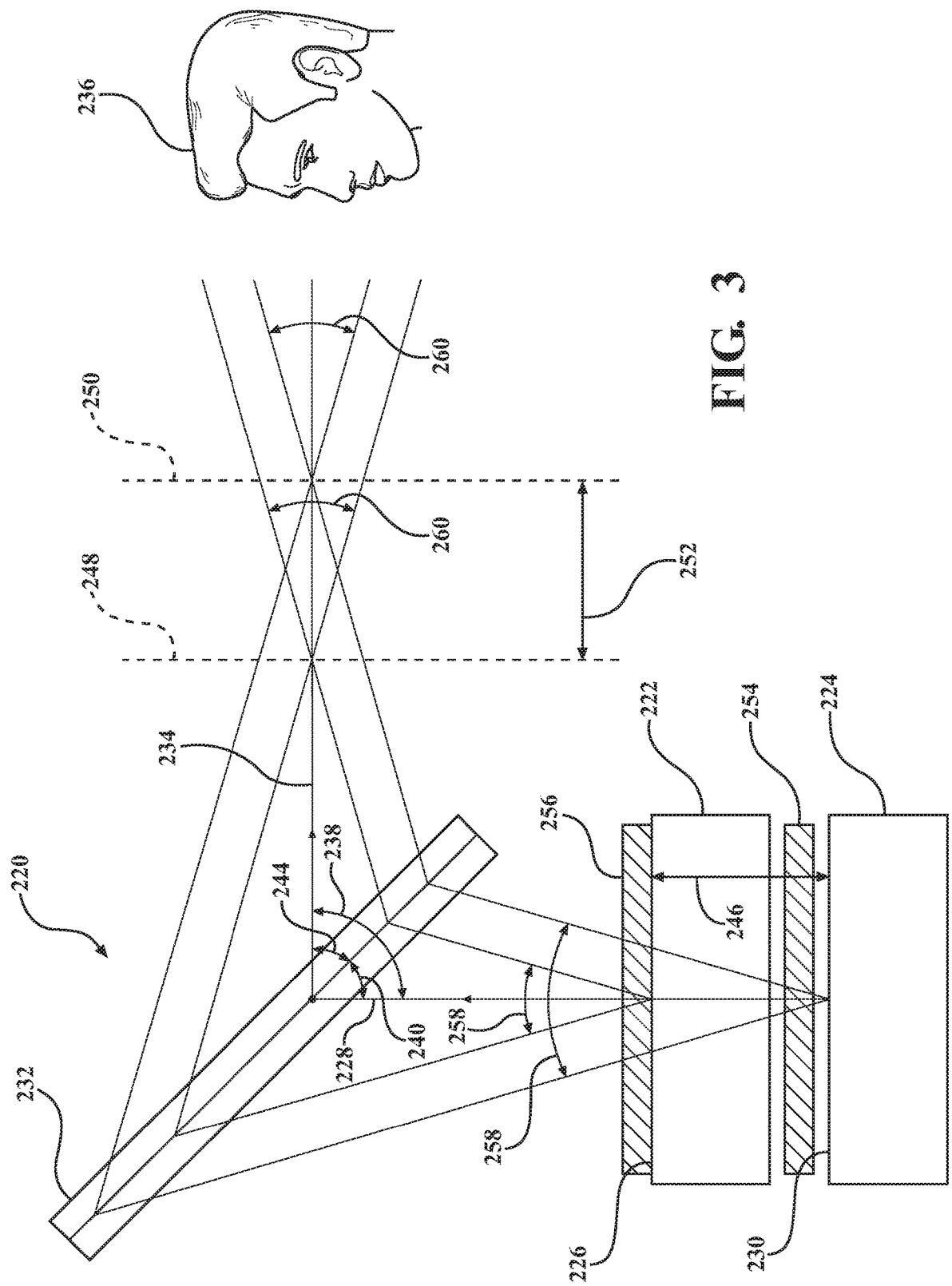
FIG. 3 is a schematic plan view of a display system, which is in accordance with one or more embodiments.

FIG. 3 shows a display system 220, which is in accordance with one or more embodiments. The display system 220 includes a first display unit 222 and a second display unit 224. The first display unit 222 may be transparent. The first display unit 222 includes a first display surface 226. The first display surface 226 may include a first display surface.

In some embodiments, the first display unit 222 is operable to emit light from the first display surface 226 along a light path 228 that is substantially orthogonal to the first display surface 226. The first display unit 222 may include a device that is transparent and capable of generating and emitting light, particularly for forming an image on the first display surface 226. The first display unit 222 may include one of, but is not limited to, a transparent OLED display, a transparent micro LED display, or a transparent LED display. In other embodiments, the first display unit 222 does not emit light, but is instead a transmissive display unit, such as but not limited to a transmissive TFT LCD display that uses a backlight for or emitted light from the second display unit 224 to transmit the image from the first display unit 222.

The second display unit 224 has a second display surface 230, which may be disposed parallel with and in spaced relationship relative to the first display surface 226 of the first display unit 222. The first display unit 222 and the second display unit 224 may be aligned along a common axis. The common axis may coincide with the light path 228. The second display unit 224 is operable to emit light from the second display surface 230 along the light path 228, and is positioned to direct the emitted light through the first display surface 226 of the first display unit 222. The second display unit 224 may include a device that is capable of generating and emitting light, particularly for forming an image on at least the second display surface 230. For example, the second display unit 224 may include, but is not limited to, a LED display, an OLED display, a TFT display, a LCD, or a PDP, etc.

A mirror array plate 232 is positioned adjacent to the first display unit 222, and is oblique relative to the first display surface 226 of the first display unit 222. The mirror array plate 232 is operable to reflect the emitted light form the first display unit 222 and the second display unit 224 along a viewing path 234, toward a viewing location 236. In one embodiment, the mirror array plate 232 is a transmissive dihedral corner reflector micro-mirror array, such as the ASKA3D plate from Asukanet Co. However, it should be appreciated the mirror array plate 232 is not limited to the aforementioned example.

As described above, the light from the first display unit 222 and the second display unit 224 is emitted along the light path 228, and the mirror array plate 232 reflects the light from the first display unit 222 and the second display unit 224 along the viewing path 234. The light path 228 and the viewing path 234 intersect, and form a reflection angle 238 therebetween. In one or more embodiments, the mirror array plate 232 is positioned at the intersection of the light path 228 and the viewing path 234, and is oriented relative to the first display surface of the first display unit 222 to bisect the reflection angle 238. In one embodiment, the reflection angle 238 is approximately ninety degrees. As such, the mirror array plate 232 is arranged to bisect the ninety degree reflection angle 238 into two equal angles, i.e., a forty five degree display side angle 240 and a forty five degree viewing side angle 244. However, it should be appreciated that the reflection angle 238 may vary more or less from the approximately ninety degree embodiment. Regardless of the value of the reflection angle 238, the mirror array plate 232 may bisect the reflection angle 238 so that the display side angle 240 and viewing side angle 244 are equal.

In one or more embodiments, the first display surface 226 and the second display surface 230 are separated along the light path 228 by a first distance 246. The mirror array plate 232 is operable to focus the reflected light from the first display unit 222 at a first viewing plane 248, and focus the reflected light form the second display unit 224 at a second viewing plane 250. The first viewing plane 248 and the second viewing plane 250 are separated along the viewing path 234 by a second distance 252. The first distance 246 may be equal to the second distance 252. Accordingly, moving the first display surface 226 and the second display surface 230 farther apart to increase the first distance 246, moves the first viewing plane 248 and the second viewing plane 250 farther apart to increase the second distance 252 a corresponding amount, whereas moving the first display surface 226 and the second display surface 230 closer together to decrease the first distance 246, moves the first viewing plane 248 and the second viewing plane 250 closer together to decrease the second distance 252 a corresponding amount.

The display system 220 may further include an interstitial layer 254. The interstitial layer 254 may be disposed between the first display unit 222 and the second display unit 224. The interstitial layer 254 may soften the transition between light emitted from the first display unit 222 and the second display unit 224. The interstitial layer 254 may include, but is not limited to, a holographic diffuser that eliminates the periodicity and the resultant Moiré between the first display unit 222 and the second display unit 224. As understood by those in the art, Moiré is an interference pattern created when two periodic structures interfere with one another.

In one or more embodiments, the display system 220 includes a single upper display unit, i.e., the first display unit 222. However, in other embodiments, the first display unit 222 may include multiple transparent display units, with each of the multiple transparent display units being separated from an adjacent display unit by a respective interstitial layer 254. The mirror array plate 232 will generate a respective image for each respective display unit, at a respective viewing plane. By so doing, multiple objects may be viewed on multiple viewing planes. As such, the display system 220 may be considered a floating three dimensional volumetric display.

In one or more embodiments, the first display unit 222 may include a micro-louver film 256 disposed adjacent to the first display surface 226 of the first display unit 222. Depending upon the specific embodiment of the first display unit 222, the micro-louver film 256 may be positioned in front of the first display unit 222, immediate next to the first display surface 226, such as shown in FIG. 3, or between the first display unit 222 and the second display unit 224. The micro-louver film 256 controls dispersion of the light emitted light from the first display unit 222 relative to the light path 228. In an embodiment, the micro-louver film 256 controls light dispersion of the light emitted from the first display unit 222 to a maximum angle 258 that is equal to the viewing angle 260 exhibited by the mirror array plate 232. The micro-louver film 256 may include a variable micro-louver film 256 that is operable to provide a non-uniform viewing cone across the first display surface 226 of the first display unit 222, or a uniform micro-louver film 256 that is operable to provide a uniform viewing cone across the first display surface 226 of the first display unit 222. The second display unit 224 may similarly include a micro-louver film.

When the first display unit 222 is embodied as a transmissive TFT LCD display, then the micro-louver film 256 may be positioned in between the interstitial layer 254 and the first display unit 222, or may be positioned in front of the first display unit 222, such as shown in FIG. 3, so that the interstitial layer 254 does not diffuse the light coming out of the louver film 256.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A display system comprising:
   a first display unit having a first display surface, wherein the first display unit is operable to emit light from the first display surface along a first light path that is substantially orthogonal to the first display surface, the first display unit includes a micro-louver film disposed adjacent to the first display surface, and the micro-louver film is operable to control light dispersion of the first light emitted from the first display unit relative to the first light path;
   a second display unit having a second display surface, wherein the second display unit is operable to emit a second light from the second display surface along a second light path that is substantially orthogonal to the second display surface;
   a mirror array plate positioned between the first display unit and the second display unit, wherein the mirror array plate is operable to redirect the first light emitted from the first display unit along a viewing path toward a viewing location, and focus the first light at a first viewing plate positioned between the mirror array plate and the viewing location, and wherein the first light approaches the mirror array plate along the first path and moves away from the mirror array plate along the viewing path, the first light has at most a single encounter with the mirror array plate, and the viewing path has a different direction than the first path; and
   a reflector disposed on an opposite side of the mirror array plate with respect to a position of the first display surface of the first display unit, wherein the reflector is operable to reflect the second light emitted from the second display unit along the viewing path toward the viewing location, the second light appears to originate from a second viewing plane as seen from the viewing location, and the first viewing plane and the second viewing plane are parallel to each other and on opposite sides of the mirror array plate.

2. The display system set forth in claim 1, wherein the micro-louver film controls light dispersion of the first light to a maximum angle of plus or minus twenty degrees relative to the first light path.

3. The display system set forth in claim 1, wherein the micro-louver film is a variable micro-louver film that is operable to provide a non-uniform viewing cone across the first display surface of the first display unit.

4. The display system set forth in claim 1, wherein the micro-louver film is a uniform micro-louver film that is operable to provide a uniform viewing cone across the first display surface of the first display unit.

5. The display system set forth in claim 1, wherein the first light path and the viewing path intersect and form a reflection angle therebetween, with the mirror array plate positioned at the intersection of the first light path and the viewing path and oriented relative to the first display surface to bisect the reflection angle.

6. The display system set forth in claim 1, wherein:
the mirror array plate includes a first surface and an opposing second surface;
the first surface and the second surface are substantially parallel with each other; and
the first display surface is positioned oblique to the mirror array plate and is positioned opposite the first surface of the mirror array plate.

7. The display system set forth in claim 6, wherein the second display surface is positioned oblique to the mirror array plate and positioned opposite the second surface of the mirror array plate, and the reflector is disposed on the second surface of the mirror array plate.

8. The display system set forth in claim 1, wherein the first viewing plane and the second viewing plane are spaced apart from each other along the viewing path.

9. The display system set forth in claim 1, wherein the reflector is semi-transparent.

10. The display system set forth in claim 1, wherein the reflector is one of a semi-transparent mirror or a semi-transparent reflective polarizing layer.

11. The display system set forth in claim 1, wherein the first display surface and the second display surface are parallel with each other.

12. The display system set forth in claim 1, wherein a first distance between the first display surface and a first surface of the mirror array plate is different than a second distance between the second display surface and a second surface of the mirror array plate.

13. The display system set forth in claim 1, wherein the first display surface is a transparent display surface.

14. The display system set forth in claim 13, wherein the second display unit is one of a Liquid Crystal Display (LCD), a Thin Film Transistor (TFT) display, or a Light Emitting Diode (LED) display.

15. The display system set forth in claim 13, wherein the first display unit is one of a transparent Organic Light Emitting Diode (OLED) display, a transparent micro Light Emitting Diode (LED) display, a transparent LED display, or a transmissive LCD display.

16. A display system comprising:
a first display unit operable to emit a first light from a first display surface along a first light path;
a second display unit operable to emit a second light from a second display surface;
a mirror array plate positioned between the first display unit and the second display unit, wherein the mirror array plate is operable to redirect the first light along a viewing path toward a viewing location, and focus the first light at a first viewing plane positioned between the mirror array plate and the viewing location, and wherein the first light approaches the mirror array plate along the first path and moves away from the mirror array plate along the viewing path, the first light has at most a single encounter with the mirror array plate, and the viewing path has a different direction than the first path; and
a reflector disposed on an opposite side of the mirror array plate with respect to a position of the first display surface of the first display unit, wherein the reflector is operable to reflect the second light along the viewing path toward the viewing location, the second light appears to originate from a second viewing plane as seen from the viewing location, and the first viewing plane and the second viewing plane are parallel to each other and on opposite sides of the mirror array plate.

17. The display system set forth in claim 16, further comprising a micro-louver film disposed adjacent to the first display unit, wherein the micro-louver film is operable to control light dispersion of the first light emitted from the first display unit relative to the first light path.

* * * * *